July 13, 1926.

J. M. YOUNGER

DEHYDRATING PLANT

Filed April 6, 1925    3 Sheets-Sheet 1

1,592,318

INVENTOR.
JOSHUA M. YOUNGER.
BY
ATTORNEYS.

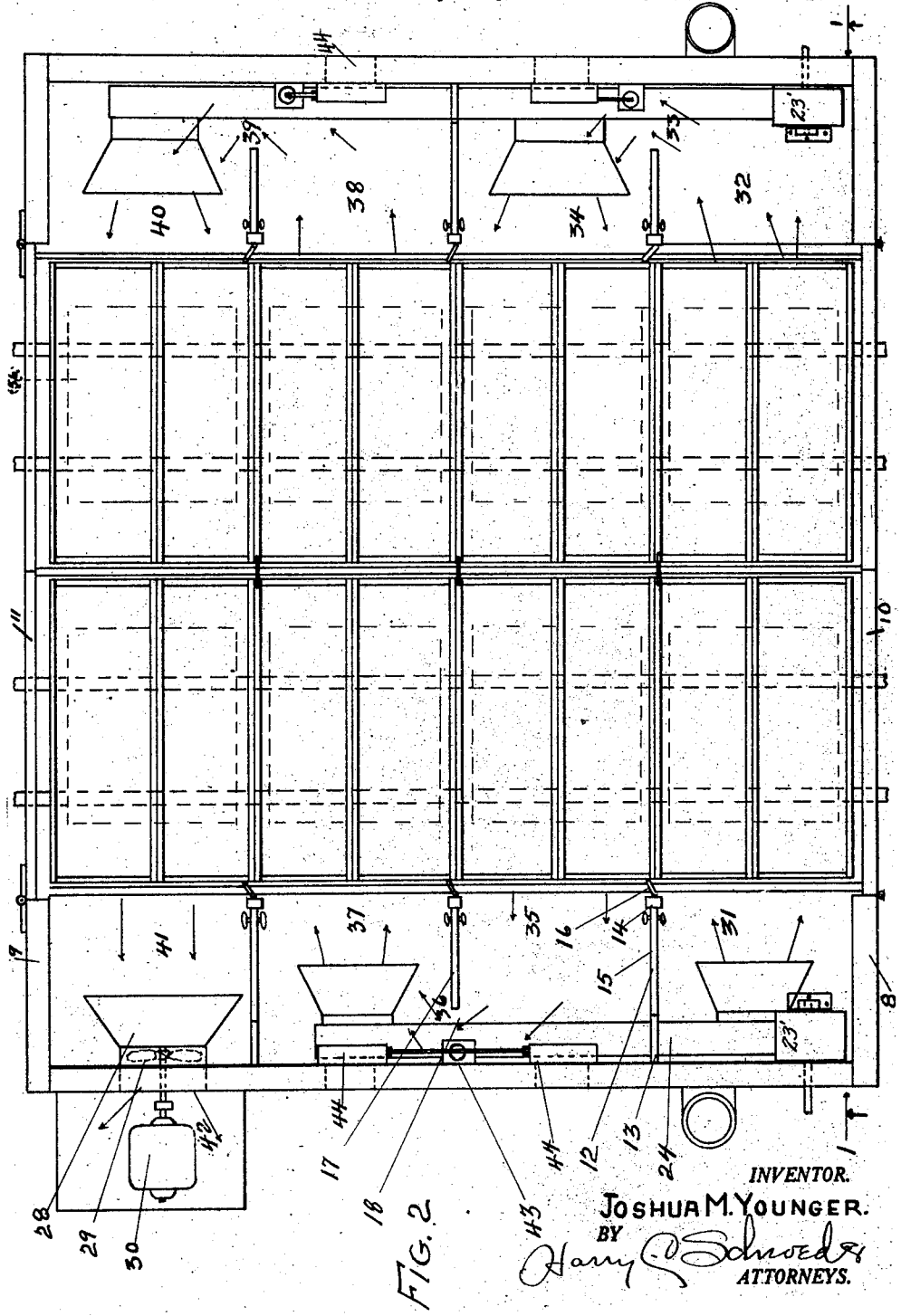

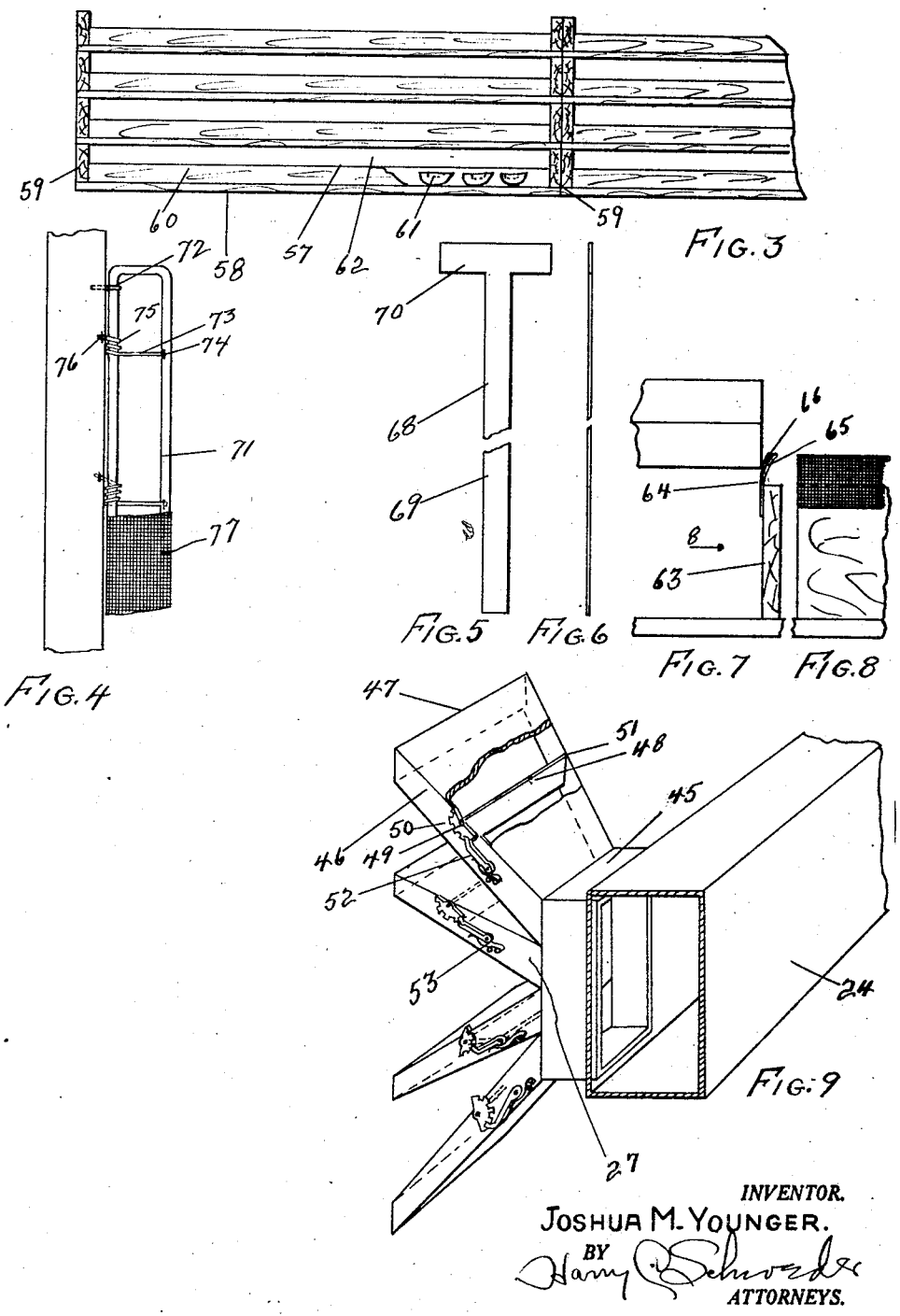

Patented July 13, 1926.

1,592,318

UNITED STATES PATENT OFFICE.

JOSHUA M. YOUNGER, OF SAN FRANCISCO, CALIFORNIA.

DEHYDRATING PLANT.

Application filed April 6, 1925. Serial No. 20,901.

My invention is an improved plant or apparatus for dehydrating or drying fruits, vegetables or the like. The fruit is treated on the continuous process; that is, it is passed in stages through the dehydrating apparatus and as one load of dried fruit is removed, another is substituted.

Some of the objects of my invention are to devise an economical building or structure in which to dry the fruits or vegetables, support the articles treated on trays piled on trucks, and to move the trucks step by step through the drier, utilizing continuous cross-currents of heated air. Other objects are to force the air in a path from one side of the trucks to the other, and then back through a second set of trucks and so forth until the fruit is dried. A further object is to distribute the hot air in a vertical and horizontal direction so that the fruit on the trays will be dried equally.

The plant used comprises a building, having preferably double tracks running lengthwise thereof, for a pair of trucks side by side. The building may be made of any suitable length, depending on the length of time and number of stages required for drying. The trays with the fruit are mounted on the trucks in such a manner and the trucks are so separated from the flow of air that substantially all the air used is driven across the trays and over the fruit. The building is provided with hot air ducts, leading to the sides; these ducts have blower fans and have outlets on opposite sides of the building, arranged in staggered relation. In order to force the air across the trucks, the air-chambers containing the outlets from the ducts are provided with blowers, and partitions, having a loosely swinging flap to bear against the trays on the trucks. Preferably heated air passes in a zig-zag flow from one end of the building to the other, having more hot air added at the successive drying stages. A suction or exhaust fan is used at the extreme end of the air-current to increase and control the draft. Various other details will appear from the following description.

My invention will be more clearly understood from the following description, considered with the drawings, in which:—

Figure 2 is a plan of the drier-house on the line 2—2 of Figure 1, in the direction of the arrows, showing the layout of the hot-air ducts and outlets, the trucks with the trays thereon, and the air currents.

Figure 3 is a detail of the trays, showing their face-to-face packing, whereby the trays themselves form a cross-partition directing the flow of air.

Figure 4 is an elevational detail of part of the partition walls with the loose, swinging flap to contact with the drier trays.

Figure 5 is an elevation of a detachable T-shaped separator to be mounted between parallel trucks, to direct the air cross-wise.

Figure 6 is an edge view of Figure 5.

Figure 7 is a cross-sectional detail showing a longitudinal curb, with a flexible screen projecting upwards to contact with the trays and prevent the air current passing under the trays and around the trucks.

Figure 8 is a side-view of Figure 7, in the direction of the arrow 8.

Figure 9 is a perspective view of one of the air-ducts illustrating the vertically displaced outlets and the construction of splayed outlets for distributing the air horizontally and vertically. This drawing also details the dampers for individually controlling any of the individual outlets.

Figure 1:
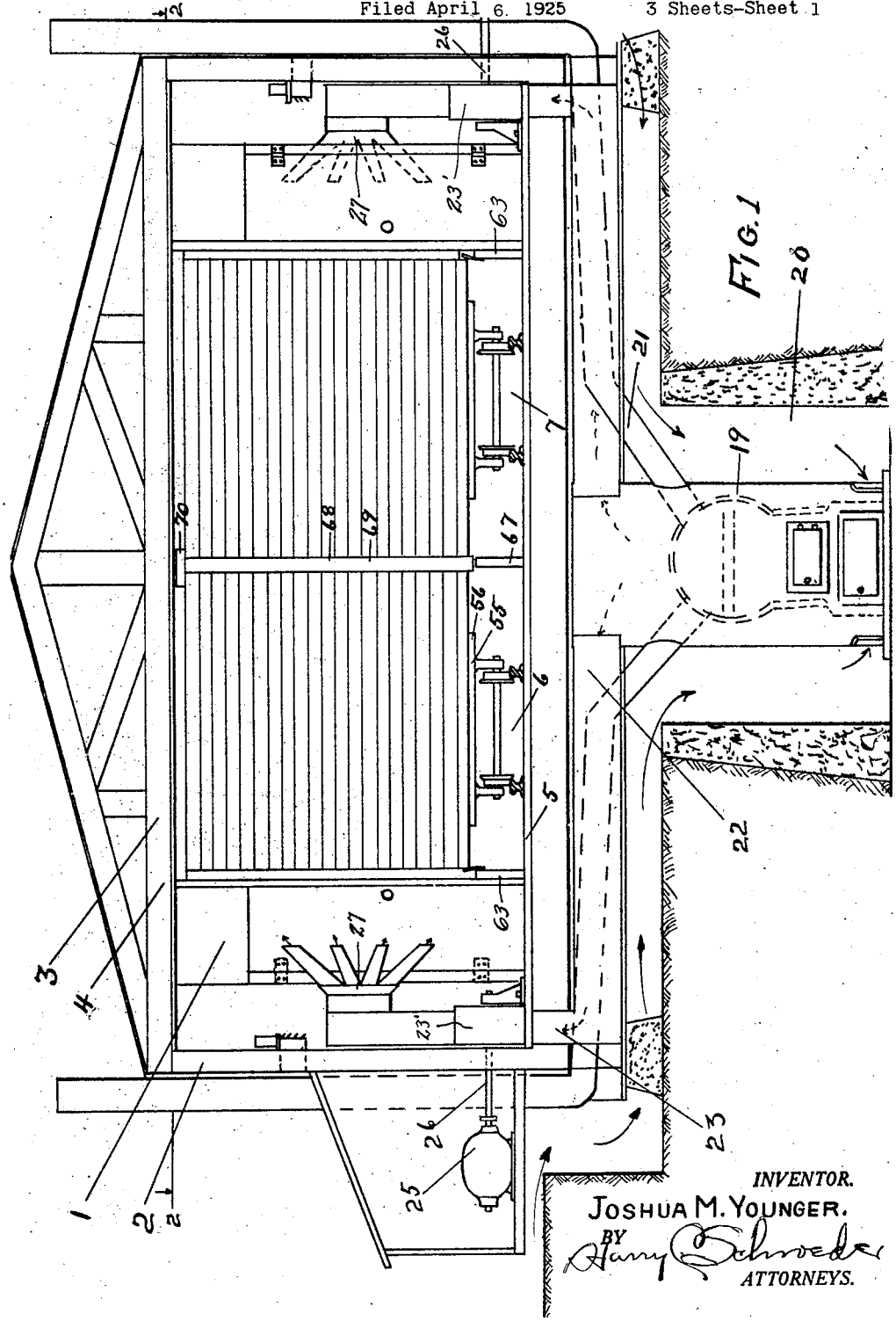
Figure 1 is a vertical section through the drier house on the line 1—1 of Figure 2 in the direction of the arrows; the view illustrating the interior construction and positioning of the trucks with the drier-trays thereon.

Referring particularly to Figures 1 and 2:—the drier building is designated by the numeral 1; having side-walls 2, roof structure 3, with a closed ceiling 4 and closed floor 5. The building structure itself may be made of any suitable material and of any suitable design in detail. The plant shown has a pair of double tracks 6 and 7, extending lengthwise from end to end of the building. The building has front and back walls 8 and 9 closed by any suitable doors; indicated by 10 and 11. The building has partition walls 12, extending from the outside walls as shown at 13, to a studding 14, adjacent the track-ways. It is preferable to have doors 15 through these partitions. A loose flap 16 is pivotally connected to the studding 14; or the inner edge of the partition; a detail of which is shown in Figure 4.

Open partitions 17 are spaced on the opposite sides of the building from the partitions 12; thereby forming a zig-zag passage for the air. These partitions are spaced at a sufficient distance from the side walls of the building to allow the air a circulating space designated by 18. The partitions 17 also preferably have doors therein.

The air circulating arrangement is as follows:—

A furnace 19 is preferably installed in a pit 20 underneath the building, and is shown with smoke-flues 21 leading up the outside walls of the building at the sides. Large hot-air ducts 22 lead from the furnace horizontally to vertical up-takes 23, at each side of the building. These latter are connected to horizontal ducts 24, extending along the inside walls on opposite sides of the building. Blower fans 23' are preferably mounted in the up-takes 23, and driven by electric motors 25, having shafts 26. These motors are, for convenience, housed outside of the building proper; with the shafts extending through the side-walls. The horizontal ducts are provided with air-outlets 27, detail of which is shown in Figure 9. An air exhaust 28 is installed at the back of the building and is preferably provided with a suction fan 29, operated by an electric motor 30. This motor is shown as housed outside of the building proper. The air is allowed to exhaust directly outside of the building. The flow of the air is indicated by the sets of arrows 31, 32, 33, 34, 35, 36, 37, 38, 39, 40, 41, and 42. A thermostatic temperature control is indicated by the thermostat 43, of types now in use, which operate ports 44 in the outside wall of the building. These ports may function to allow the hot moisture-laden air to pass out, or the cool air from outside to enter, depending on the relative pressures of air in the building as controlled by the pressure fans.

The air-outlets, as shown in Figure 9, are constructed as follows:—

The horizontal duct 24 has the air-outlets 27 in the form of an outlet box 45, having a series of radiating discharge pipes 46, positioned to discharge the air over a considerable vertical area, as indicated in Figure 1. These pipes are splayed outwardly in a horizontal direction, as indicated by 47, to give the air a horizontal spread in the air chambers. Dampers 48 are pivotally mounted in the discharge pipes and are shown with the segment 49 having ratchet teeth 50 on the end of their spindles 51. A dog or pawl 52 is pivotally mounted on the outside of the discharge pipes 46, and pressed by a spring, 53 into engagement with the teeth 50. By hand manipulation the dampers can thus be set to vary the opening of any discharge pipe and hence give air its proper distribution to dry the stacked fruit in a proper manner.

The construction of the trays and manner of stacking the fruit, vegetables or the like, is as follows:—

Trucks 55 run on the tracks 6 and 7 and preferably have a rectangular flat table 56, indicated in dotted lines in Figure 2. The trays 57 are shown in detail in Figure 3, and are built up with a flat bottom-board 58, high end boards 59 and low side boards 60. The fruit or vegetable or other product to be dried, indicated by the numeral 61 is placed on the bottom board in the usual manner. The trays are stacked one on top of the other, leaving an open space 62 at the sides, due to the low side boards 60. These openings face the sides of the building, and the air outlet and inlet passages. Each truck is loaded with the stacked trays, and a truck with fresh fruit is used to shove the trucks in the drier by the contact of the end boards 59 of the trays, as shown in Figure 3.

In using my drier, a pair of trucks with their stacked load of trays, would be shoved through the front doorway 10, and thereby shove the four trucks on each track towards the back of the building thereby displacing the last pair of trucks with their load of completely dried fruit. These would be withdrawn through the doors 11 from the back wall 9. Both sets of doors would be closed and the drying operation continued.

In order to properly direct and control the heated air in the drier building without undue waste of air or ineffective flow, it is desirable to block off all dead spaces. To this end a curb 63, shown in detail in Figures 7 and 8, runs lengthwise of the building on the outside of each pair of tracks. A flexible screen 64 is mounted on the upper edge of the curbs, and is designed to press resiliently against the bottom tray of a stack. These screens are made of a spring wire fabric, having up-rights 65, and a covering of cloth 66, or other suitable material designed to make a close contact between the screens and the bottom trays to prevent undue passage of air. A center curb 67 is shown extending longitudinally of the building to further restrict the passage of air underneath the bottom tray and around the trucks. This space underneath the trucks will of course be filled with heated air, but this will be more or less still and hence not form a passage for the free flow of the drying air currents.

A T-shaped separator 68, shown in detail in Figures 5 and 6, is preferably made of a flat piece of sheet iron, having a stem 69 and a cross-head 70. This is placed with the cross-head bearing on the top end-board of the top trays on each pair of trucks as they are inserted, and with the stem 69 extending downwardly between the adjacent stacks of trays, towards the centercurb 67. It is preferable to have a separator 68 at the front and back end of each pair of adjacent stacks of trays on each pair of trucks. These form guides for loading the trays. It will thus be seen by reference to Figure 1 that the air is forced to travel across each pair of adjacent trucks, with their stacked trays.

In order to prevent the air currents from passing around the partitions 12 and 17, between the edge of the partitions and the stacks of trays, swinging flaps 16 are pivotally connected to the studding or the edge of the partition. These are shown in detail in Figure 4. Each flap is built up of a frame 71, preferably rectangular in shape, and formed of metal. These frames are connected by a hinge 72 to allow swinging movement. A simple spring construction to stress the flaps in alignment with the partitions, comprises a wire 73, attached to one part of the frame, indicated at 74, coiled around the inner bar of the frame, as at 75, and secured to the studding by staple or the like, 76. Two springs coiled in opposite directions, as shown in Figure 4, tend to keep the flap in its outward position. Each flap is covered with a more or less air-tight fabric or other material, 77. By reference to Figure 1 it will be seen that the flaps are slightly displaced by the trays, but maintain a closure at the abutting ends of the contiguous stacks of trays on the same track. This detail forces the air to travel backwards and forwards in a zig-zag path, through the pairs of adjacent stacks of trays.

The plant I have illustrated for drying fruits, vegetables, etc., is shown as of the double track type, but the same type of construction could be used for a single track having single trucks from front to back of the drier building; or the building could be widened to accommodate three or more tracks to provide for inserting and withdrawing either the one, two, three or more truck-loads at a time. Various dampers and other air-control devices may be installed in the various air-ducts and passages; and in a very large installation it may be desirable to have separate ducts lead from the furnace to each outlet 27.

The layout of my plant and the manner in which the heated air is introduced and exhausted, is designed to maintain the temperature in the drying part of the building at substantially a constant temperature; but if desired the temperature may be considerably higher at the back end of the building towards the exhaust end than at the front. It is a simple matter to have the air at each discharge opening 27 of higher temperature than the one preceding it.

I find that for drying such products as prunes, a temperature of from 150° to 160° F. is satisfactory, and for apricots, peaches, pears or the like, temperatures between 140° and 150° is satisfactory. The prunes usually require, to be maintained in my drying plant, about 24 hours. The other fruits above mentioned about 20 hours. The quantity or amount of hot air forced through the plant will be more or less dependent on the relative inside pressure in the building, and that outside considered with the natural humidity of the air, and how quickly it becomes saturated.

My drying plant can be considerably modified in detail without departing from the spirit thereof; and considerably changed to suit special circumstances or materials to be handled.

Having described my invention what I claim is:—

1. In an air drying plant discharge means for heated air comprising an air duct and a plurality of flattened pipes extending fan-like therefrom, said pipes being splayed outwards at their discharge end whereby the air is discharged in different directions in a vertical plane, and spread horizontally.

2. In an air drying plant discharge means for heated air having an air-duct, a plurality of flattened pipes extending fan-like therefrom, said pipes being splayed outwards from their discharge ends and an adjustable damper in each of said pipes, said pipes discharging the air in different directions and spreading it horizontally and said dampers allowing the regulation of each outlet.

3. In an air drying plant for fruit or the like two parallel trucks having stacks of trays supported thereon and a curb between the trucks having a flexible screen adapted to contact with a bottom tray and thereby prevent transverse passage of air under the trucks.

4. In an air drying plant for fruit or the like a combination of a truck having a stack of trays supported thereon and a partition having swinging flaps adapted to contact with the stack of trays and prevent the passage of air along the stack of trays and around the partition, the flaps being constructed of a metal frame, hinged and springs being coiled in opposite directions around part of the frame and secured in different positions on the partition on opposite sides of the flap, adapted to hold the flap outward from the partition.

5. In an air drying plant for fruit or the like the combination of a pair of trucks on parallel track-ways, a stack of trays supported on each truck and a T-shaped separator having a flat strip adapted to extend downwardly between the stacks of trays and a cross-head to be supported from upper trays.

6. A drying plant for fruit or the like comprising in combination a building structure, a furnace installed below said building, air-ducts for heated air extending from the furnace horizontally along the sides of the building, passage-ways extending through the building from front to back, having door-ways through which to move the trucks with stacks of trays, a plurality of partitions extending from the sides of the building towards the passage-ways, a plurality of outlets from the air-ducts in a staggered position between said partitions, each alternate partition having an opening, an air outlet passage and fans blowing the air into the building from the furnace and exhausting the air from the building, said partitions being positioned to be opposite the adjacent ends of trays on the trucks from front to back of the passage-ways.

7. A drying plant for fruit or the like comprising in combination a building structure, a plurality of hot-air inlets along the sides of the building, partitions forming a zig-zag path for the hot air from front to back of the building, air ports through the wall of the building situated between the partitions, means to control the opening and closing of said ports, some of the ports being situated in the path of the hot-air whereby it blows outwardly.

8. A drying plant for fruit or the like as claimed in claim 7, having in addition a plurality of ports between the partitions situated in relation to the hot-air inlets whereby outside air may be drawn into the building.

9. In a drier of the character described, a plurality of parallel ways, trucks having trays stacked thereon so as to form solid front and rear walls while presenting lateral draft openings adapted to be arranged on the ways in registering sets and means for closing spaces between aligned front or rear walls of the stacks whereby a set of stacks is combined into one unit allowing draft to pass therethrough from side to side only.

10. In a drier of the character described a furnace disposed in a well and spaced from the walls thereof, a building structure superimposed thereon and spaced from the ground surface so as to allow air to be drawn by the furnace to the bottom of the well, passages for heated air extending from the furnace along the bottom of the structure and on opposite sides of the same and flues for products of combustion within the said passages for superheating the air.

In testimony whereof I affix my signature.

JOSHUA M. YOUNGER.